United States Patent
Matsushita et al.

(10) Patent No.: US 11,473,923 B2
(45) Date of Patent: Oct. 18, 2022

(54) VEHICLE DISPATCH SYSTEM FOR AUTONOMOUS DRIVING VEHICLE AND AUTONOMOUS DRIVING VEHICLE

(71) Applicant: TOYOTA JIDOSHA KABUSHIKI KAISHA, Toyota (JP)

(72) Inventors: Koki Matsushita, Tokyo (JP); Masaki Wasekura, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 504 days.

(21) Appl. No.: 16/127,644

(22) Filed: Sep. 11, 2018

(65) Prior Publication Data

US 2019/0128694 A1 May 2, 2019

(30) Foreign Application Priority Data

Oct. 26, 2017 (JP) .............................. JP2017-207370

(51) Int. Cl.
*G01C 21/00* (2006.01)
*G01C 21/36* (2006.01)
(Continued)

(52) U.S. Cl.
CPC ......... *G01C 21/3629* (2013.01); *G05D 1/021* (2013.01); *G06V 20/56* (2022.01);
(Continued)

(58) Field of Classification Search
CPC .. G01C 21/3629; G06V 20/597; G06V 40/20; G06V 20/56; G05D 1/021; G05D 2201/0213; G10L 13/00; G10L 13/027
See application file for complete search history.

(56) References Cited

U.S. PATENT DOCUMENTS 9,547,307 B1 1/2017 Cullinane
10,024,678 B2 * 7/2018 Moore .................... G01S 19/14
(Continued)

FOREIGN PATENT DOCUMENTS

CN 105955099 A 9/2016
CN 106274806 A 1/2017
(Continued)

OTHER PUBLICATIONS

Partial Translation of Office Action dated May 31, 2021 from the China National Intellectual Property Administration in Application No. 201811050762.7.
(Continued)

*Primary Examiner* — Truc M Do
(74) *Attorney, Agent, or Firm* — Sughrue Mion, PLLC

(57) ABSTRACT

A vehicle dispatch system is configured to execute user type identification processing for identifying a user type indicating whether the user is a visually handicapped person or a healthy person, and when the user is identified to be a visually handicapped person, execute voice guidance processing for performing voice guidance for a visually handicapped person. The autonomous driving vehicle includes an image recognition unit configured to perform image recognition of the user. The voice guidance processing includes guidance information generation processing for generating guidance information including a moving direction for allowing the user to approach the autonomous driving vehicle based on an image recognition result of the image recognition unit, and guidance information transfer processing for transferring the guidance information to the user by voice.

10 Claims, 7 Drawing Sheets

(51) Int. Cl.
    *G05D 1/02*     (2020.01)
    *G10L 13/027*     (2013.01)
    *G10L 13/00*     (2006.01)
    *G06V 20/56*     (2022.01)
    *G06V 20/59*     (2022.01)
    *G06V 40/20*     (2022.01)

(52) U.S. Cl.
    CPC ............ *G06V 20/597* (2022.01); *G06V 40/20* (2022.01); *G10L 13/00* (2013.01); *G10L 13/027* (2013.01); *G05D 2201/0213* (2013.01)

(56) References Cited

U.S. PATENT DOCUMENTS

2014/0135598 A1* 5/2014 Weidl .................... A61B 5/163
    600/301

2015/0339928 A1* 11/2015 Ramanujam ........... G06Q 50/30
    701/23
2017/0003132 A1* 1/2017 Kim ........................ G01C 21/20
2017/0316696 A1* 11/2017 Bartel ............... B60W 50/0098

FOREIGN PATENT DOCUMENTS

| | | | | |
|---|---|---|---|---|
| CN | 106959690 A | 7/2017 | | |
| CN | 107221151 A | 9/2017 | | |
| WO | WO-2017155740 A1 * | 9/2017 | ............. | B60R 25/00 |

OTHER PUBLICATIONS

Translation of the Communication dated Dec. 2, 2021 from the China National Intellectual Property Administration in Chinese Application No. 201811050762.7.

Yonggang Zhang, "Road Traffic Control Technology and Application", Press of People's Public Security University of China, 2016, pp. 290-291 (4 pages total).

* cited by examiner

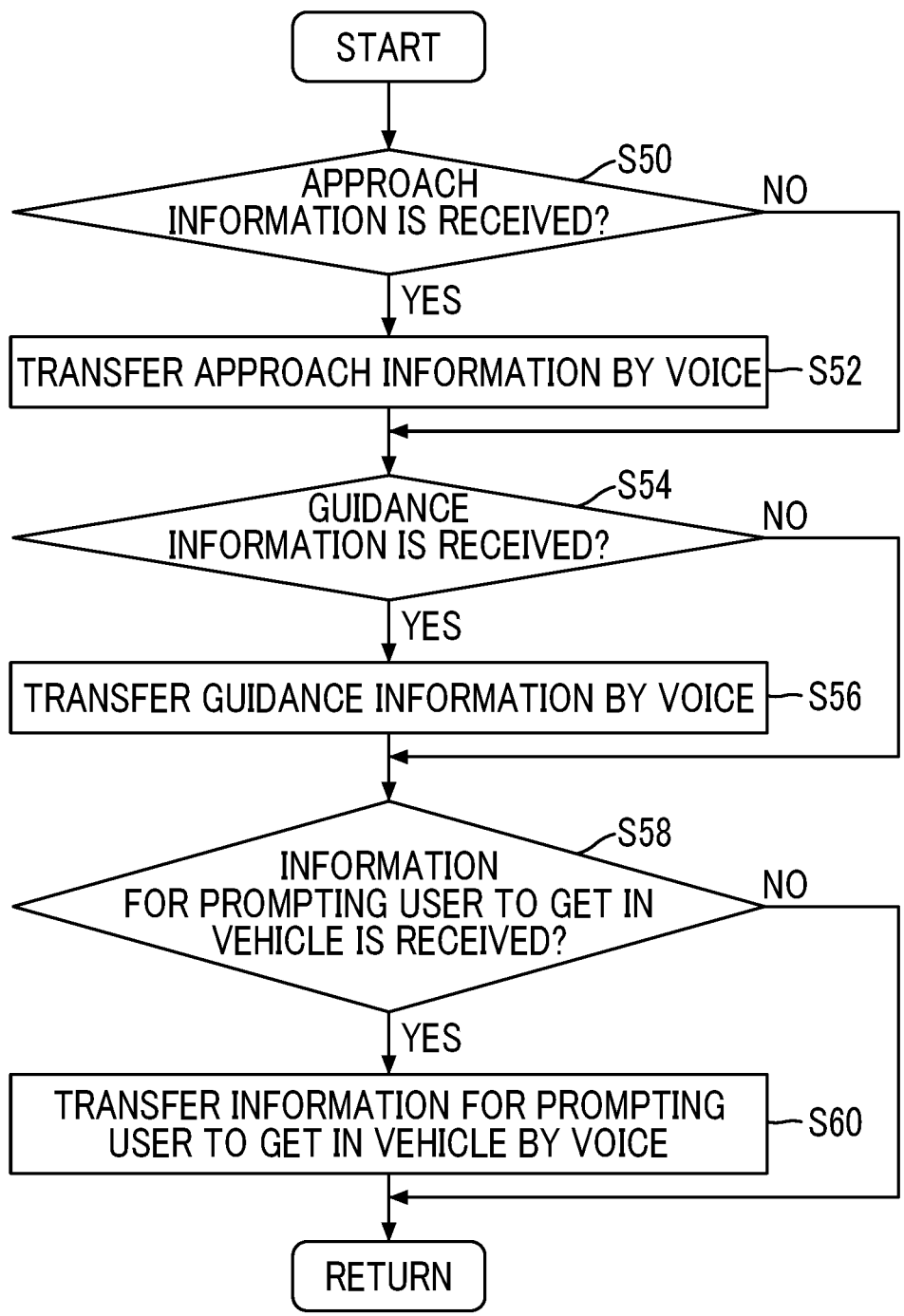

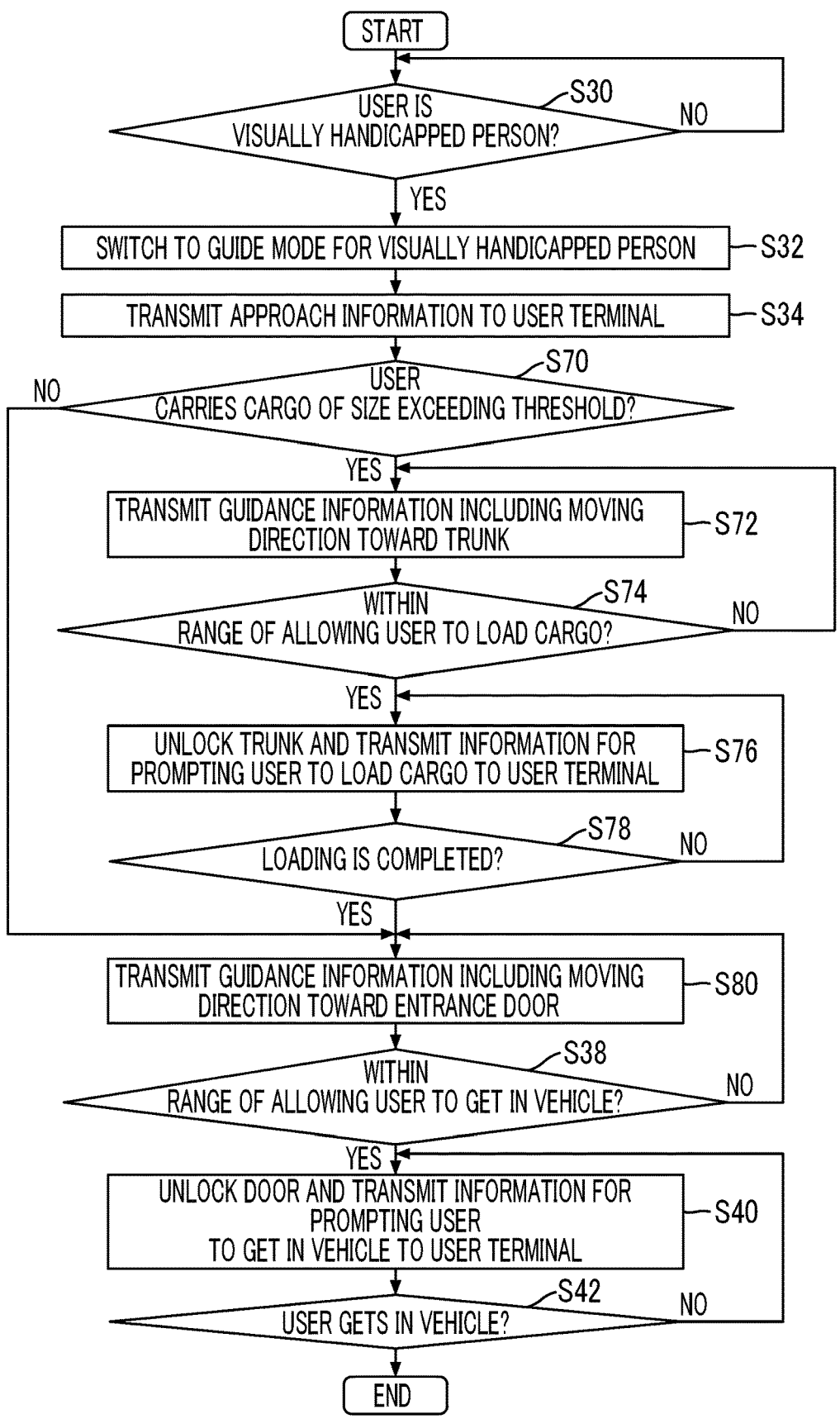

VEHICLE DISPATCH SYSTEM FOR AUTONOMOUS DRIVING VEHICLE AND AUTONOMOUS DRIVING VEHICLE

INCORPORATION BY REFERENCE

The disclosure of Japanese Patent Application No. 2017-207370 filed on Oct. 26, 2017 including the specification, drawings and abstract is incorporated herein by reference in its entirety.

BACKGROUND

1. Technical Field

The present disclosure relates to a vehicle dispatch system for an autonomous driving vehicle that provides a vehicle dispatch service, and an autonomous driving vehicle for use in the vehicle dispatch system.

2. Description of Related Art

U.S. Pat. No. 9,547,307 discloses a technique relating to a vehicle dispatch service using an unmanned autonomous driving vehicle. Specifically, in the technique, when the autonomous driving vehicle approaches the pickup position desired by the user, the autonomous driving vehicle searches for a parking or stopping place. When a parking or stopping place is not found, the autonomous driving vehicle is stopped at an alternative position different from the pickup position desired by the user. Then, the autonomous driving vehicle notifies the user of the alternative position and prompts the user to come to the alternative position.

SUMMARY

As in U.S. Pat. No. 9,547,307, when the vehicle dispatch service of the autonomous driving vehicle is provided, the following problem may occur. The problem is that, when a user of the vehicle dispatch service is a visually handicapped person, it is difficult for the user to walk up to the vehicle. For this reason, when the user of the vehicle dispatch service is a visually handicapped person, it is desirable to guide the user to the vehicle using a method different from a healthy person.

The disclosure provides a vehicle dispatch system for an autonomous driving vehicle capable of, in a case where a user of a vehicle dispatch service is a visually handicapped person, smoothly guiding the user to a dispatched autonomous driving vehicle, and an autonomous driving vehicle for use in the vehicle dispatch system.

A first aspect of the disclosure relates to a vehicle dispatch system for an autonomous driving vehicle that provides a vehicle dispatch service of an autonomous driving vehicle to a user. The vehicle dispatch system includes a control device. The control device is configured to provide information for guiding the user to the autonomous driving vehicle when the autonomous driving vehicle picks the user up. The control device is configured to execute user type identification processing for identifying a user type indicating whether the user is a visually handicapped person or a healthy person, and when the user is identified to be a visually handicapped person, execute voice guidance processing for performing voice guidance for the visually handicapped person. The autonomous driving vehicle includes an image recognition unit. The image recognition unit is configured to perform image recognition of the user. The voice guidance processing includes guidance information generation processing for generating guidance information including a moving direction for allowing the user to approach the autonomous driving vehicle based on an image recognition result of the image recognition unit, and guidance information transfer processing for transferring the guidance information to the user by voice.

In the vehicle dispatch system according to the first aspect of the disclosure, the user type identification processing may be configured to identify the user type according to whether or not an article associated with the visually handicapped person is included in belongings of the user recognized by the image recognition unit.

In the vehicle dispatch system according to the first aspect of the disclosure, the guidance information generation processing may be configured to estimate the moving direction based on a direction of the user recognized by the image recognition unit or a direction of a cane carried with the user.

In the vehicle dispatch system according to the first aspect of the disclosure, the voice guidance processing may further include approach information transfer processing for transferring approach information by voice when the autonomous driving vehicle approaches a pickup position desired by the user (hereinafter, simply referred to as a "pickup position").

In the vehicle dispatch system according to the first aspect of the disclosure, the voice guidance processing may further include getting-in information transfer processing for transferring information for prompting the user to get in the autonomous driving vehicle by voice when the user approaches a position where the user is able to get in the autonomous driving vehicle.

In the vehicle dispatch system according to the first aspect of the disclosure, the image recognition unit may be configured to perform image recognition of cargo information as information relating to a cargo carried with the user. The guidance information generation processing may be configured to, when a cargo exceeding a predetermined size is included in the cargo information, generate the guidance information including a moving direction for allowing the user to walk up to a trunk of the autonomous driving vehicle.

In the vehicle dispatch system according to the first aspect of the disclosure, the voice guidance processing may be configured to perform the voice guidance using a voice output device of a user terminal carried with the user.

In the vehicle dispatch system according to the first aspect of the disclosure, the voice guidance processing may be configured to perform the voice guidance using a voice output device of the autonomous driving vehicle.

A second aspect of the disclosure relates to an autonomous driving vehicle that provides a vehicle dispatch service in response to a vehicle dispatch request from a user terminal carried with a user. The autonomous driving vehicle includes an image recognition unit and a control device. The image recognition unit is configured to perform image recognition of the user. The control device is configured to provide information for guiding the user to the autonomous driving vehicle when the autonomous driving vehicle picks the user up. The control device is configured to execute user type identification processing for identifying a user type indicating whether the user is a visually handicapped person or a healthy person, and when the user is identified to be a visually handicapped person, execute voice guidance processing for performing voice guidance for the visually handicapped person. The voice guidance processing includes guidance information generation processing for generating guidance information including a moving direction for allowing the user to approach the autonomous driving vehicle based on an image recognition result of the image recognition unit, and guidance information transmission processing for transmitting the guidance information to the user terminal.

In the autonomous driving vehicle according to the second aspect of the disclosure, the user type identification processing may be configured to identify the user type according to whether or not an article associated with a visually handicapped person is included in belongings of the user recognized by the image recognition unit.

According to the first aspect or the second aspect, when the user of the vehicle dispatch service is a visually handicapped person, it is possible to transfer the moving direction for allowing the user to walk up to the autonomous driving vehicle by voice. With this, since it is possible to smoothly guide a visually handicapped person to a dispatched autonomous driving vehicle, it is possible to provide a vehicle dispatch service with high convenience.

According to the first aspect or the second aspect, it is possible to determine the user type by performing the image recognition of the belongings of the user. With this, even in a driverless autonomous driving vehicle, it is possible to identify the user type.

According to the first aspect, it is possible to estimate the moving direction of the user based on the direction of the visually handicapped person or the direction of the cane carried with the user recognized by the image recognition unit. With this, it is possible to estimate an appropriate moving direction according to the state of the visually handicapped person.

According to the first aspect, when the autonomous driving vehicle approaches the pickup position, it is possible to transfer the approach information to the user by voice. With this, it is possible to allow even a visually handicapped person to recognize approach of a dispatched autonomous driving vehicle.

According to the first aspect, when a visually handicapped person approaches a position where the visually handicapped person is able to get in the autonomous driving vehicle, it is possible to transfer information for prompting the visually handicapped person to get in the autonomous driving vehicle by voice. With this, it is possible to assist a visually handicapped person in getting in the autonomous driving vehicle.

According to the first aspect, when a visually handicapped person carries a cargo exceeding a predetermined size, it is possible to transfer a moving direction for allowing the visually handicapped person to walk up to the trunk by voice. With this, it is possible to assist a visually handicapped person in loading a cargo.

According to the first aspect, the voice guidance is performed using the voice output device of the user terminal carried with the user. With this, since it is possible to allow the user to receive voice guidance from the user terminal carried with the user, it is possible to provide a vehicle dispatch service with high convenience for the user.

According to the first aspect, the voice guidance is performed using the voice output device of the autonomous driving vehicle. With this, it is possible to allow the user to use a transmission direction of voice as a material for determining a stop position of the autonomous driving vehicle.

As described above, according to the first and second aspects of the disclosure, it is possible to provide a vehicle dispatch system for an autonomous driving vehicle capable of, when the user of the vehicle dispatch service is a visually handicapped person, smoothly guiding the user to a dispatched autonomous driving vehicle, and an autonomous driving vehicle for use in the vehicle dispatch system.

BRIEF DESCRIPTION OF THE DRAWINGS

Features, advantages, and technical and industrial significance of exemplary embodiments will be described below with reference to the accompanying drawings, in which like numerals denote like elements, and wherein:

FIG. 9 is a flowchart showing a routine that a control device of a user terminal executes in the voice guidance processing; and FIG. 10 is a flowchart showing a routine where a control device of an autonomous driving vehicle executes voice guidance processing in a vehicle dispatch system for an autonomous driving vehicle of Embodiment 2.

DETAILED DESCRIPTION OF EMBODIMENTS

Figure 1:
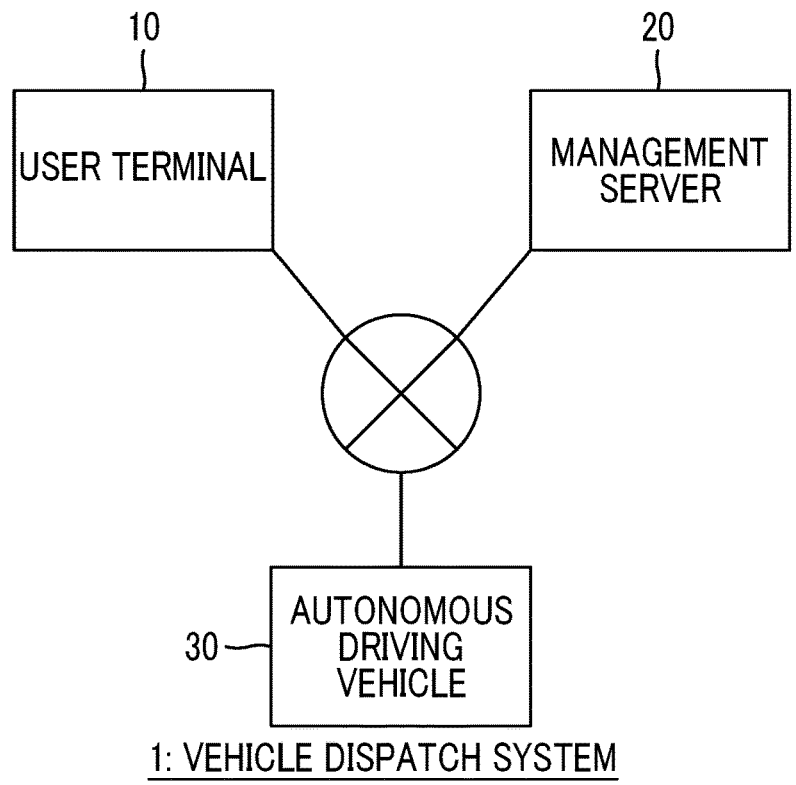
FIG. 1 is a block diagram schematically showing the configuration of a vehicle dispatch system for an autonomous driving vehicle according to an embodiment.

Hereinafter, embodiments will be described referring to the drawings. It is to be understood that, in a case where number, such as the number of pieces of each element, numerical quantity, amount, and range, are mentioned in the following embodiments, except for a case where the numbers are particularly clearly specified or apparently specified in principle. The structure, steps, and the like described in the following embodiments are not necessarily essential, except for a case where the structure, steps, and the like are particularly clearly specified or apparently specified in principle.

Embodiment 1

1-1. Vehicle Dispatch System for Autonomous Driving Vehicle

FIG. 1 is a block diagram schematically showing the configuration of a vehicle dispatch system for an autonomous driving vehicle according to Embodiment 1. A vehicle dispatch system 1 provides a vehicle dispatch service of an autonomous driving vehicle to a user. The vehicle dispatch system 1 includes a user terminal 10, a management server 20, and an autonomous driving vehicle 30.

The user terminal 10 is a terminal that is carried with the user of the vehicle dispatch service. The user terminal 10 includes at least a processor, a storage device, a communication device, and a voice output device, and can execute various kinds of information processing and communication processing. For example, the user terminal 10 can communicate with the management server 20 and the autonomous driving vehicle 30 through a communication network. As the user terminal 10 described above, a smartphone is exemplified.

The management server 20 is a server that primarily manages the vehicle dispatch service. The management server 20 includes at least a processor, a storage device, and a communication device, and can execute various kinds of information processing and communication processing. For example, the management server 20 can communicate with the user terminal 10 and the autonomous driving vehicle 30 through the communication network. The management server 20 manages information of the user. Furthermore, the management server 20 manages vehicle dispatch or the like of the autonomous driving vehicle 30.

The autonomous driving vehicle 30 can be in an unmanned operation. The autonomous driving vehicle 30 provides the vehicle dispatch service to a pickup position and a transportation service to a destination to the user. The autonomous driving vehicle 30 can communicate with the user terminal 10 and the management server 20 through the communication network.

A basic flow of the vehicle dispatch service of the autonomous driving vehicle is as follows.

Figure 2:
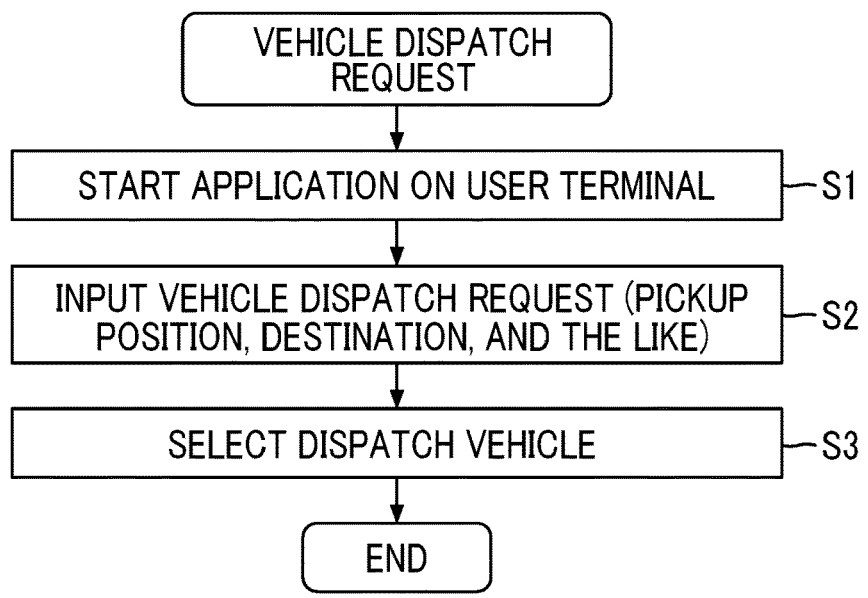
FIG. 2 is a flowchart showing an example of a procedure of a vehicle dispatch request.

First, the user transmits a vehicle dispatch request using the user terminal 10. FIG. 2 is a flowchart showing an example of a procedure of the vehicle dispatch request. As shown in the drawing, the user first starts a dedicated application on the user terminal 10 (Step S1). Next, the user operates the started application to input the vehicle dispatch request (Step S2). The vehicle dispatch request includes a pickup position desired by the user, a destination, and the like. The pickup position may be obtained from positional information of the user terminal 10. The vehicle dispatch request is sent to the management server 20 through the communication network. The management server 20 selects a vehicle that provides the service to the user from among the autonomous driving vehicles 30 around the user (Step S3), and sends information of the vehicle dispatch request to the selected autonomous driving vehicle 30. The autonomous driving vehicle 30 that receives information automatically moves toward the pickup position. The autonomous driving vehicle 30 provides a transportation service where the autonomous driving vehicle 30 makes the user get in the autonomous driving vehicle 30 at the pickup position, and then, automatically travels toward the destination. In the following description, the dispatched autonomous driving vehicle 30 is referred to as an "dispatched vehicle".

1-2. Outline of Vehicle Dispatch Service with Voice Guidance for Visually Handicapped Person When the dispatched vehicle picks the user up in the vehicle dispatch service of the autonomous driving vehicle 30, the following problem may occur. For example, in a case where a user of the vehicle dispatch service is a visually handicapped person, it may be difficult for the user to specify the dispatched vehicle and to walk up to the pickup position.

With the vehicle dispatch system for an autonomous driving vehicle of the embodiment, in a case where the dispatched vehicle recognizes that the user of the vehicle dispatch service is a visually handicapped person, voice guide for guiding the user to be a visually handicapped person to the dispatched vehicle is provided. Specifically, the dispatched vehicle recognizes a position and a direction of the user using sensors mounted in the dispatched vehicle. The direction of the user may be determined, for example, based on a direction of a cane carried with the user. Then, the dispatched vehicle guides a moving direction for allowing the user to walk up from the recognized position of the user to the dispatched vehicle by voice. The guide by voice described above may be provided from a voice output device provided in the dispatched vehicle or may be provided from the voice output device mounted in the user terminal carried with the user. With the vehicle dispatch service for a visually handicapped person described above, it is possible to smoothly guide a visually handicapped person to the dispatched vehicle.

Hereinafter, the configuration of the autonomous driving vehicle 30, the configuration of the user terminal 10, and the vehicle dispatch service accompanied with voice guidance for a visually handicapped person constituting the vehicle dispatch system 1 for an autonomous driving vehicle according to the embodiment will be described in detail.

1-3. Configuration Example of Autonomous Driving Vehicle

Figure 3:
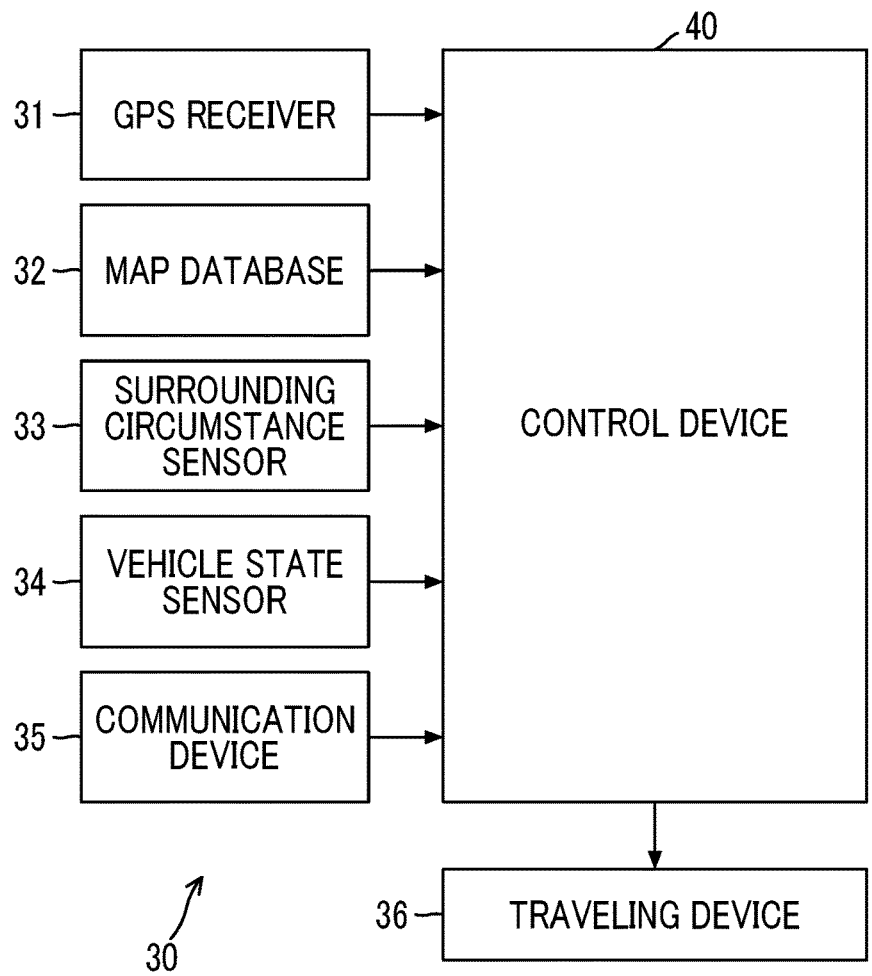
FIG. 3 is a block diagram showing a configuration example of an autonomous driving vehicle according to the embodiment.

FIG. 3 is a block diagram showing a configuration example of the autonomous driving vehicle 30 according to the embodiment. The autonomous driving vehicle 30 includes a global positioning system (GPS) receiver 31, a map database 32, a surrounding circumstance sensor 33, a vehicle state sensor 34, a communication device 35, a traveling device 36, and a control device 40. The GPS receiver 31 receives signals transmitted from a plurality of GPS satellites and calculates a position and an azimuth of the vehicle based on the received signals. The GPS receiver 31 sends the calculated information to the control device 40.

In the map database 32, map information, such as landforms, roads, and traffic signs, and information indicating a boundary position of each lane of a road on a map are stored in advance. The boundary position of each lane is represented by a point group or a line group. The map database 32 is stored in a predetermined storage device.

The surrounding circumstance sensor 33 detects circumstances around the vehicle. As the surrounding circumstance sensor 33, laser imaging detection and ranging (LIDAR), a radar, a camera, or the like is exemplified. The lidar detects an object around the vehicle using light. The radar detects an object around the vehicle using an electric wave. The camera captures images of circumstances around the vehicle. The surrounding circumstance sensor sends the detected information to the control device 40.

The vehicle state sensor 34 detects a traveling state of the vehicle. As the vehicle state sensor 34, a lateral acceleration sensor, a yaw rate sensor, a vehicle speed sensor, or the like is exemplified. The lateral acceleration sensor detects a lateral acceleration that is applied to the vehicle. The yaw rate sensor detects a yaw rate of the vehicle. The vehicle speed sensor detects a speed of the vehicle. The vehicle state sensor 34 sends the detected information to the control device 40.

The communication device 35 performs communication with the outside of the autonomous driving vehicle 30. Specifically, the communication device 35 performs communication with the user terminal 10 through the communication network. The communication device 35 performs communication with the management server 20 through the communication network.

The traveling device 36 includes a drive device, a braking device, a steering device, a transmission, and the like. The drive device is a power source that generates drive power. As the drive device, an engine or an electric motor is exemplified. The braking device generates braking force. The steering device steers wheels. For example, the steering device includes an electronic power steering (EPS) device. The wheels can be steered through drive control of a motor of the electronic power steering device.

The control device 40 executes autonomous driving control for controlling autonomous driving of the vehicle. Typically, the control device 40 is a microcomputer including a processor, a storage device, and an input/output interface. The control device 40 is also referred to as an electronic control unit (ECU). The control device 40 receives various kinds of information through the input/output interface. Then, the control device 40 executes the autonomous driving control based on the received information. For example, the control device 40 executes the autonomous driving control for making the vehicle automatically move toward the pickup position based on information of the vehicle dispatch request received from the management server 20.

The control device 40 executes the localization processing for estimating an accurate dispatched vehicle position based on comparison of the surrounding environment storage information stored in the map database 32 with the surrounding environment recognition information recognized by the surrounding circumstance sensor 33.

In the localization processing, first, the control device 40 acquires the surrounding environment storage information. Specifically, environment information surrounding the vehicle position calculated based on the received signals of the GPS receiver 31 among information stored in the map database 32 is acquired as a surrounding environment storage information associated with positional information. As the surrounding environment storage information, an object, such as a landform, a road, a lane, or a traffic sign, is exemplified. Next, the control device 40 acquires environment information surrounding the vehicle position among information recognized using the surrounding circumstance sensor 33 as surrounding environment recognition information associated with positional information. As the surrounding environment recognition information, an image around the vehicle captured by the camera, an object, such as a landform, a road, a lane, a traffic sign, recognized by the lidar, or the like is exemplified. Next, the control device 40 estimates the position and the azimuth of the host vehicle by comparing the acquired surrounding environment storage information with the acquired surrounding environment recognition information. With the estimation of the vehicle position through the localization processing described above, it is possible to estimate a more accurate vehicle position than in a case where the vehicle position is estimated solely using the GPS receiver 31.

1-4. Configuration Example of User Terminal

Figure 4:
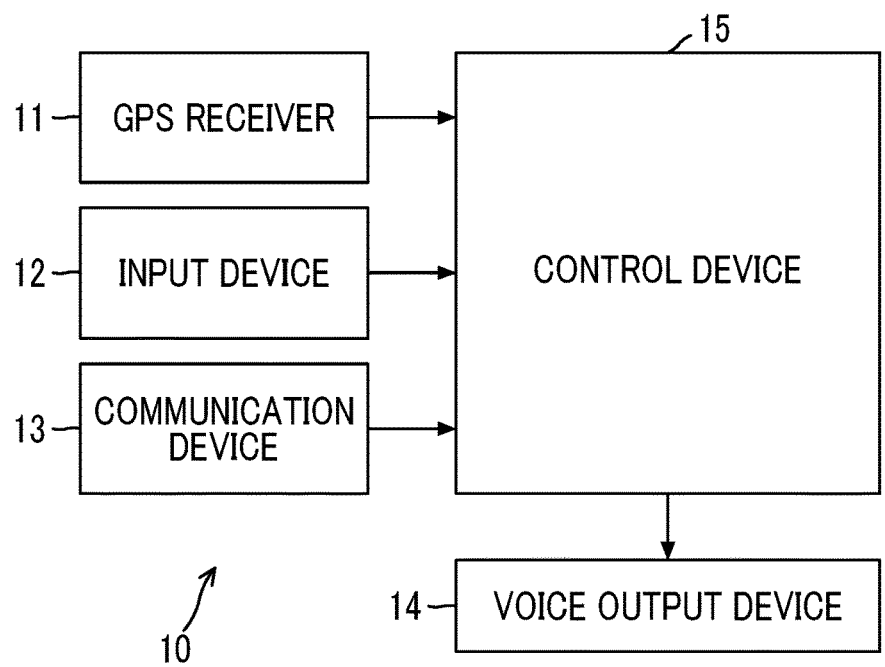
FIG. 4 is a block diagram showing a configuration example of a user terminal according to the embodiment.

FIG. 4 is a block diagram showing a configuration example of the user terminal 10 according to the embodiment. The user terminal 10 includes a global positioning system (GPS) receiver 11, an input device 12, a communication device 13, a voice output device 14, and a control device 15. The GPS receiver 11 receives signals transmitted from a plurality of GPS satellites and calculates a position and an azimuth of the user terminal 10 based on the received signals. The GPS receiver 11 sends the calculated information to the control device 15.

The input device 12 is a device that is used when the user inputs information and operates the application. As the input device 12, a touch panel, a switch, or a button is exemplified. The user can input, for example, the vehicle dispatch request using the input device 12.

The communication device 13 performs communication with the outside of the user terminal 10. Specifically, the communication device 13 performs communication with the autonomous driving vehicle 30 through the communication network. The communication device 13 performs communication with the management server 20 through the communication network.

The voice output device 14 is a device that outputs voice. As the voice output device 14, a speaker or a headphone is exemplified.

The control device 15 controls various operations of the user terminal 10. Typically, the control device 15 is a microcomputer including a processor, a storage device, and an input/output interface. The control device 15 is also referred to as an electronic control unit (ECU). The control device 15 receives various kinds of information through the input/output interface. Then, the control device 15 performs various operations based on the received information.

1-5. User Type Identification Processing

Figure 5:
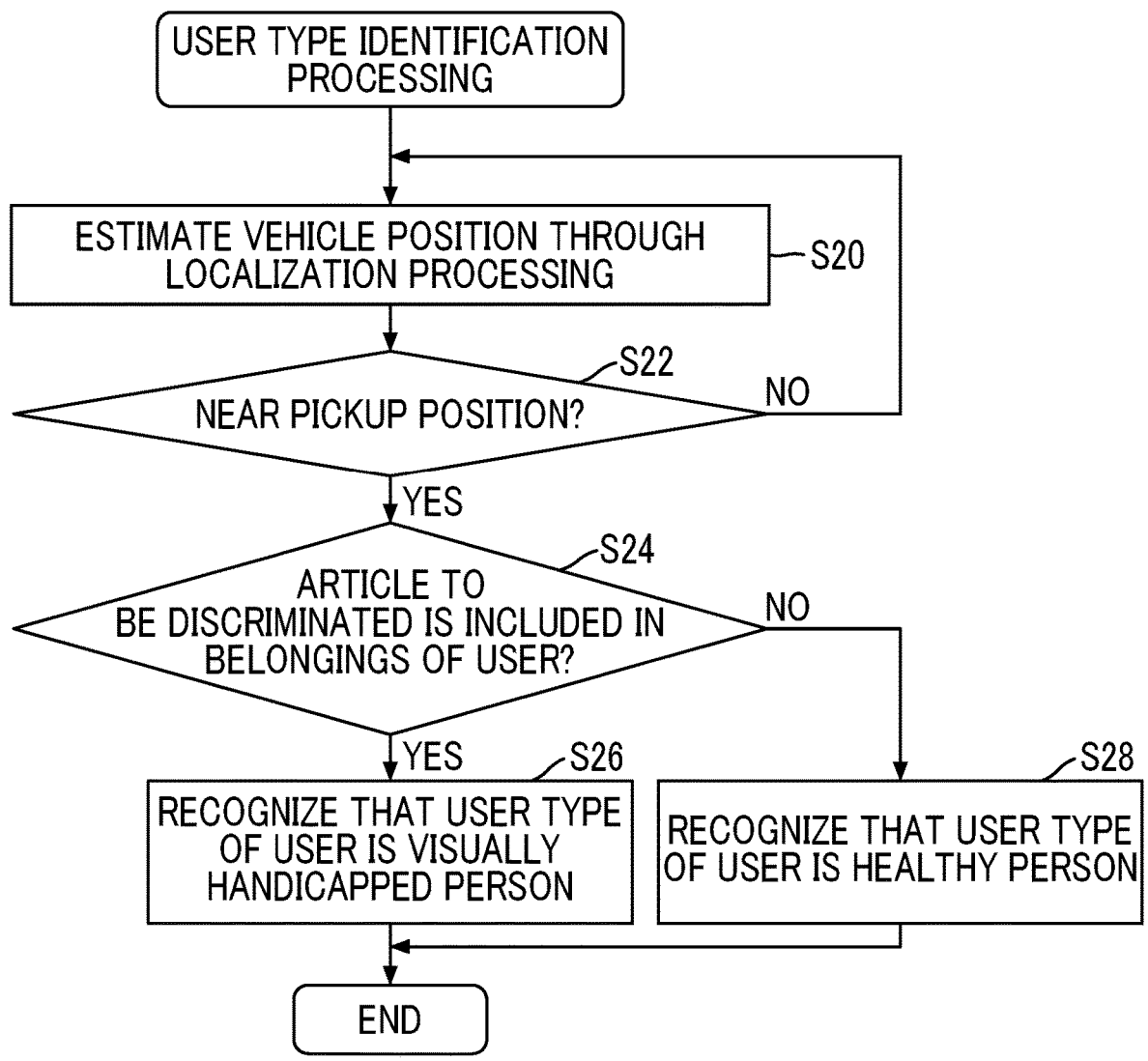
FIG. 5 is a flowchart showing a routine of user type identification processing that the control device of the autonomous driving vehicle executes.

In a case where the dispatched autonomous driving vehicle 30 approaches the pickup position, the autonomous driving vehicle 30 executes user type identification processing for identifying a type (hereinafter, referred to as a "user type") indicating whether the user who is on standby at the pickup position is a healthy person or a visually handicapped person. FIG. 5 is a flowchart showing a routine where the control device 40 of the autonomous driving vehicle 30 executes the user type identification processing. The routine is executed in the dispatched autonomous driving vehicle 30. In the routine shown in FIG. 5, first, the control device 40 estimates the vehicle position through the above-described localization processing (Step S20). Next, the control device 40 determines whether or not the dispatched vehicle reaches near the pickup position (Step S22). In Step S22, determination is made whether or not the vehicle position estimated in Step S20 falls within a predetermined range from the pickup position input in the vehicle dispatch request. As a result, in a case where determination is not established, the process returns to Step S20.

In the processing of Step S22, in a case where determination is established, the process progresses to the next step. In the next step, the control device 40 determines whether or not an article to be discriminated is included in belongings of the user who is on standby at the pickup position (Step S24). The article to be discriminated in Step S24 is an article associated with a visually handicapped person. As an article to be discriminated, for example, a tool, such as a cane, that a visually handicapped person generally uses, a mark dedicated to the service distributed to a visually handicapped person in advance, or the like is exemplified. The control device 40 performs identification of the article to be discriminated through image recognition using the surrounding circumstance sensor 33 mounted in the autonomous driving vehicle 30.

As a result of determination of Step S24, in a case where determination is made that the user carries an article to be discriminated, the control device 40 recognizes that the user type of the user is a visually handicapped person (Step S26). As a result of determination of Step S24, in a case where determination is made that the user does not carry an article to be discriminated, the control device 40 recognizes that the user type of the user is a healthy person (Step S28). With the user type identification processing described above, it is possible to identify the user type of the user who is on standby at the pickup position with high accuracy.

1-6. Vehicle Dispatch Service with Voice Guidance

In the vehicle dispatch system 1 for an autonomous driving vehicle of the embodiment, as a guide mode at the time of pickup, a guide mode for a healthy person that is set in a case where the user who is on standby at the pickup position is a healthy person and a guide mode for a visually handicapped person that is set in a case where the user is a visually handicapped person are provided. In a case where the guide mode is set to the guide mode for a healthy person, information regarding the vehicle type, color, number, and the like of the dispatched autonomous driving vehicle 30 is transferred to the user terminal 10 carried with the user by voice or characters. The user finds and walks up to the autonomous driving vehicle 30 personally with reference to the transmitted information.

In contrast, in a case where the guide mode is set to the guide mode for a visually handicapped person, processing (hereinafter, referred to as "voice guidance processing") for guiding the user to the dispatched vehicle through voice guide assuming that the user is a visually handicapped person is performed. In the voice guidance processing, guidance by voice is transferred from the voice output device 14 of the user terminal 10 carried with the user. Specifically, in the voice guidance processing, in a case where the dispatched vehicle approaches the pickup position, approach information of the dispatched vehicle is transferred by voice. In the voice guidance processing, a moving direction for allowing the user to walk up to the dispatched vehicle is transferred by voice. In the voice guidance processing, in a case where the user reaches a position where the user is able to get in the dispatched vehicle, information for promoting the user to get in the dispatched vehicle is transferred by voice. Hereinafter, in the voice guidance processing, specific processing that the control device 40 of the autonomous driving vehicle 30 executes and specific processing that the control device 15 of the user terminal 10 executes will be described in order according to a flowchart.

Figure 6:
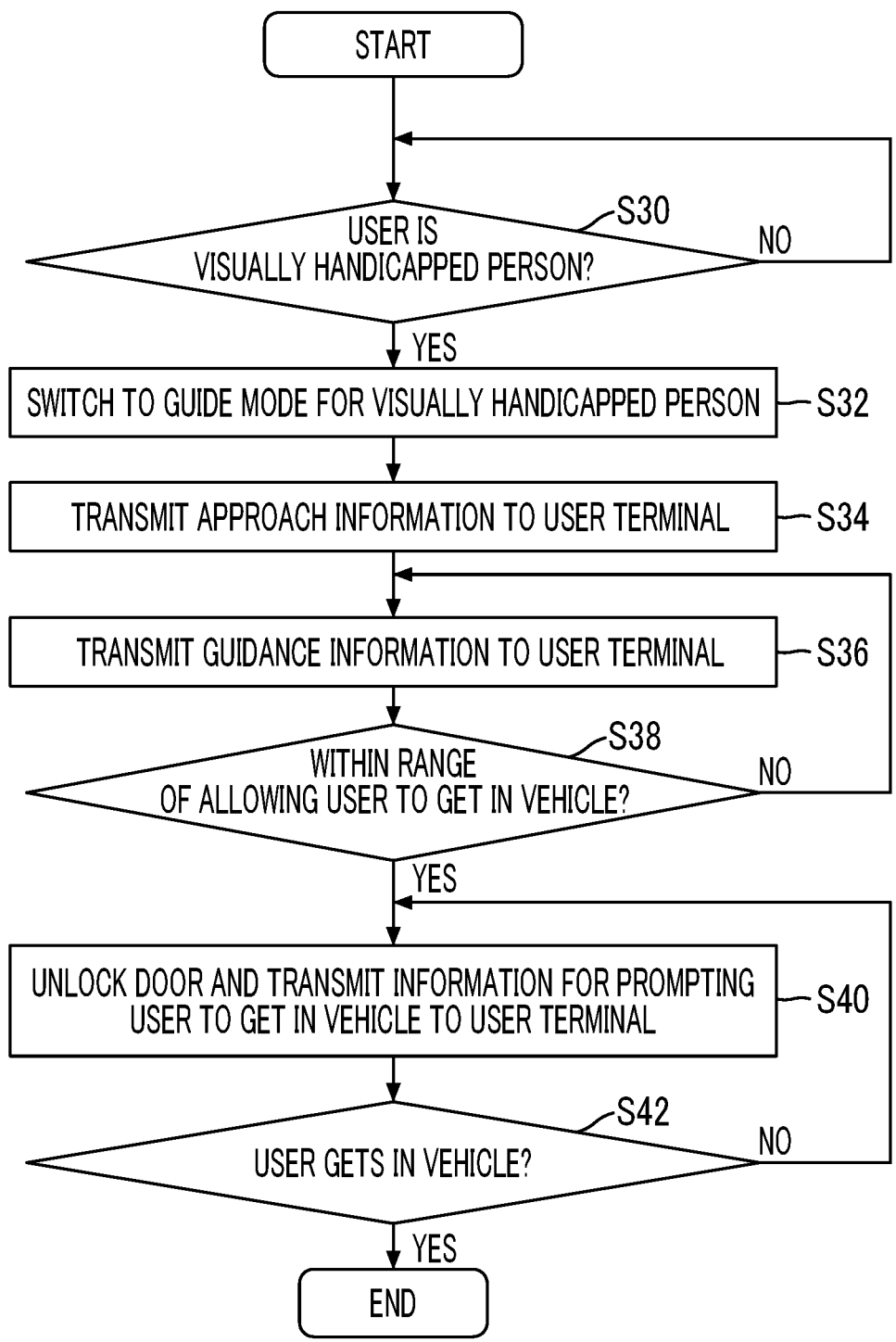
FIG. 6 is a flowchart showing a routine where a control device of an autonomous driving vehicle executes voice guidance processing in a vehicle dispatch system for an autonomous driving vehicle of Embodiment 1.

FIG. 6 is a flowchart showing a routine where the control device 40 of the autonomous driving vehicle 30 executes the voice guidance processing in the vehicle dispatch system for an autonomous driving vehicle of Embodiment 1. The routine is executed when the dispatched autonomous driving vehicle 30 picks the user up. In the routine shown in FIG. 6, first, the control device 40 determines whether or not the user is a visually handicapped person (Step S30). In Step S30, the control device 40 determines whether or not the user is recognized to be a visually handicapped person through the above-described user type identification processing. As a result, in a case where establishment of determination is recognized, the process progresses to the next step, and in a case where establishment of determination is not recognized, the processing of the step is repeatedly executed.

In the next step, the control device 40 switches the guide mode at the time of pickup from the guide mode for a healthy person to the guide mode for a visually handicapped person (Step S32). An initial setting of the guide mode is set as the guide mode for a healthy person.

Figure 7:
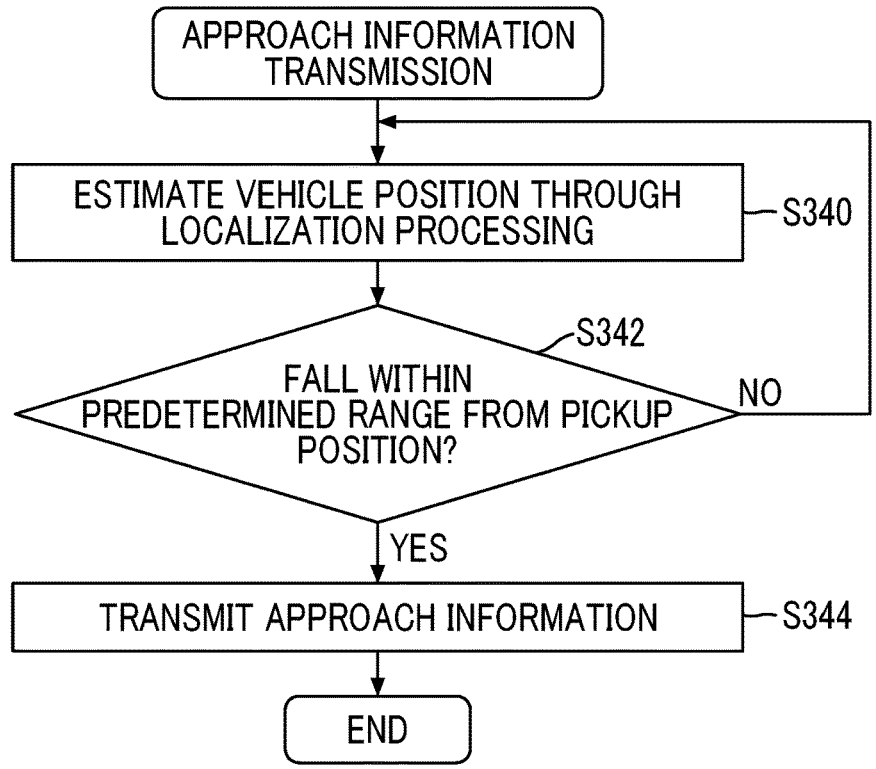
FIG. 7 is a flowchart showing a subroutine that the control device of the autonomous driving vehicle executes in the voice guidance processing.

Next, the control device 40 transmits approach information to the user terminal 10 (Step S34). The approach information in Step S34 is information indicating that the dispatched autonomous driving vehicle 30 approaches the pickup position. FIG. 7 is a flowchart showing a subroutine that the control device 40 of the autonomous driving vehicle 30 executes in the voice guidance processing. The control device 40 executes the subroutine shown in FIG. 7 in Step S34.

In the subroutine shown in FIG. 7, the control device 40 first estimates the vehicle position of the autonomous driving vehicle 30 through the localization processing (Step S340). Next, the control device 40 determines whether or not the estimated vehicle position falls within a predetermined range from the designated pickup position (Step S342). As a result, in a case where establishment of determination is not recognized, the processing of Step S340 is executed again, and in a case where establishment of determination is recognized, the process progresses to the next step. In the next step, the control device 40 transmits the approach information to the user terminal 10 (Step S344). The approach information may be transmitted from the autonomous driving vehicle 30 to the user terminal 10 through the management server 20 or may be transmitted directly from the autonomous driving vehicle 30 to the user terminal 10 through wireless communication.

Figure 8:
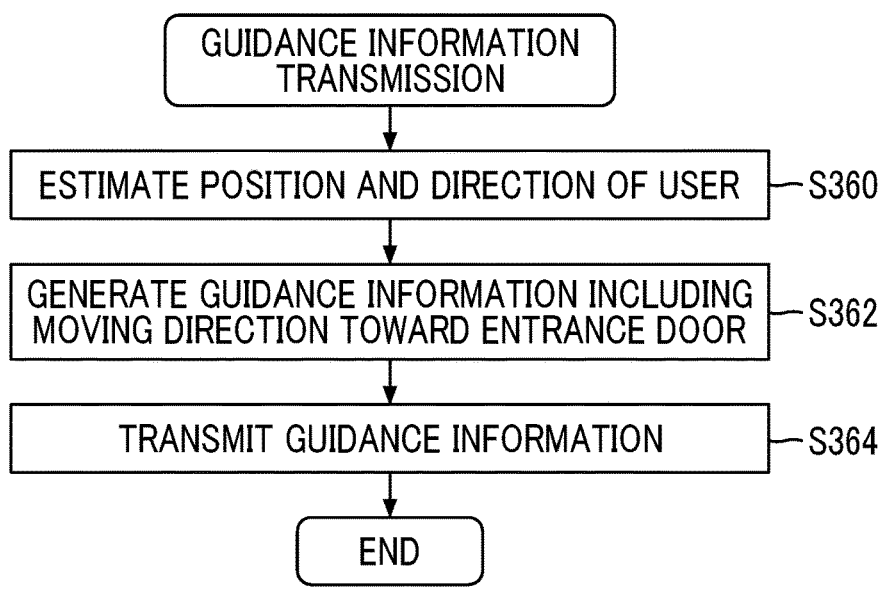
FIG. 8 is a flowchart showing a subroutine that the control device of the autonomous driving vehicle executes in the voice guidance processing.

Returning to the routine shown in FIG. 6, the control device 40 transmits guidance information for guiding the user to the dispatched vehicle to the user terminal 10 (Step S36). FIG. 8 is a flowchart showing a subroutine that the control device 40 of the autonomous driving vehicle 30 executes in the voice guidance processing. The control device 40 executes the subroutine shown in FIG. 8 in Step S36.

In the subroutine shown in FIG. 8, the control device 40 first estimates a position and a direction of the user through image recognition using surrounding environment information recognized by the surrounding circumstance sensor 33 mounted in the autonomous driving vehicle 30 (Step S360). A method of estimating the position and the direction of the user is not limited. A method of estimating a position or a direction of a person using signals received by the GPS receiver 11 of the user terminal 10 or images recognized by the surrounding circumstance sensor 33, such as a lidar, has been already suggested in various documents. In Step S360, it is possible to estimate the position and the direction of the user using the above-described known technique.

Next, the control device 40 generates the guidance information for guiding the user to the dispatched vehicle (Step S362). The guidance information in Step S362 is information including a moving direction for allowing the user to walk up to an entrance door of the autonomous driving vehicle 30. The control device 40 estimates the moving direction for allowing the user to walk up to the entrance door of the autonomous driving vehicle 30 based on an image recognition result including the position and the direction of the user, the surrounding environment information recognized by the surrounding circumstance sensor 33, and the position of the autonomous driving vehicle 30 estimated through the localization processing. Next, the control device 40 generates voice information including the estimated moving direction as the guidance information.

Next, the control device 40 transmits the generated guidance information to the user terminal 10 (Step S364). The guidance information may be transmitted from the autonomous driving vehicle 30 to the user terminal 10 through the management server 20 or may be transmitted directly from the autonomous driving vehicle 30 to the user terminal 10 through wireless communication.

Returning to the routine shown in FIG. 6, the control device 40 determines whether or not the user approaches within a range in which the user is able to get in the autonomous driving vehicle 30 (Step S38). In Step S38, determination is made whether or not the position of the user estimated using the surrounding environment information is within the range in which the user is able to get in the autonomous driving vehicle 30. As a result, in a case where establishment of determination is not recognized, the processing of Step S36 is executed again, and in a case where establishment of determination is recognized, the process progresses to the next step.

In the next step, the control device 40 unlocks the door of the autonomous driving vehicle 30 and transmits getting-in information as information for prompting the user to get in the autonomous driving vehicle 30 to the user terminal 10 (Step S40). As the getting-in information, for example, guide of the door being unlocked, guide of the type (hinge door, slide door, or the like) or shape of the door, a position of a door knob, or a way of opening the door, or the like is exemplified. The getting-in information may be transmitted from the autonomous driving vehicle 30 to the user terminal 10 through the management server 20 or may be transmitted directly from the autonomous driving vehicle 30 to the user terminal 10 through wireless communication.

Next, the control device 40 determines whether or not the user gets in the autonomous driving vehicle 30 using an image of an in-vehicle camera of the autonomous driving vehicle 30 (Step S42). As a result, in a case where establishment of determination is not recognized, the processing of Step S40 is executed again, and in a case where establishment of determination is recognized, the routine ends.

The control device 15 of the user terminal 10 executes the following routine in the voice guidance processing. FIG. 9 is a flowchart showing a routine that the control device 15 of the user terminal 10 executes in the voice guidance processing. The routine shown in FIG. 9 is repeatedly executed during the execution of the voice guidance processing.

In Step S50 of the routine shown in FIG. 9, first, the control device 15 of the user terminal 10 determines whether or not the approach information is received from the management server 20 or the autonomous driving vehicle 30. As a result, in a case where establishment of determination is not recognized, the process progresses to Step S54, and in a case where establishment of determination is recognized, the process progresses to Step S52. In Step S52, the control device 15 transfers the received approach information from the voice output device 14 by voice, and progresses to Step S54.

In next Step S54, the control device 15 determines whether or not the guidance information is received from the management server 20 or the autonomous driving vehicle 30. As a result, in a case where establishment of determination is not recognized, the process progresses to Step S58, and in a case where establishment of determination is recognized, the process progresses to Step S56. In Step S56, the control device 15 transfers the received guidance information from the voice output device 14 by voice, and progresses to Step S58.

In next Step S58, the control device 15 determines whether or not the getting-in information for prompting the user to get in the autonomous driving vehicle 30 is received from the management server 20 or the autonomous driving vehicle 30. As a result, in a case where establishment of determination is not recognized, the routine ends, and in a case where establishment of determination is recognized, the process progresses to Step S60. In Step S60, the control device 15 transfers the received information from the voice output device 14 by voice, and ends the routine.

With the voice guidance processing described above, in a case where the user is a visually handicapped person, it is possible to smoothly guide the user to the dispatched vehicle. As described above, with the vehicle dispatch system for an autonomous driving vehicle of Embodiment 1, it is possible to provide a vehicle dispatch service with high convenience.

In the vehicle dispatch system for an autonomous driving vehicle of Embodiment 1, the control device 40 and the control device 15 are an example of the "control device" of the first aspect. The surrounding circumstance sensor 33 is an example of the "image recognition unit" of the first aspect. The processing of Step S30 is an example of the "user type identification processing" of the first aspect. The processing of Steps S53, S56, and S60 is an example of the "voice guidance processing" of the first aspect. The processing of Step S36 is an example of the "guidance information generation processing" of the first aspect. The processing of Step S56 is an example of the "guidance information transfer processing" of the first aspect.

In the vehicle dispatch system for an autonomous driving vehicle of Embodiment 1, the processing of Step S52 is an example of the "approach information transfer processing" of the first aspect. The processing of Step S60 is an example of the "getting-in information transfer processing" of the first aspect.

In the autonomous driving vehicle of Embodiment 1, the control device 40 is an example of the "control device" of the second aspect. The surrounding circumstance sensor 33 is an example of the "image recognition unit" of the second aspect. The processing of Step S30 is an example of the "user type identification processing" of the second aspect. The processing of Steps S53, S56, and S60 is an example of the "voice guidance processing" of the second aspect. The processing of Step S36 is an example of the "guidance information generation processing" of the second aspect. The processing of Step S56 is an example of the "guidance information transmission processing" of the second aspect.

1-7. Modification Example of Embodiment 1

The vehicle dispatch system for an autonomous driving vehicle of Embodiment 1 may be applied with a modified form as follows.

In the guidance information, other kinds of accessory information suitable for smoothly guiding the user to the autonomous driving vehicle 30 as well as the moving direction for allowing the user to walk up to the dispatched vehicle may be included. As the accessory information described above, for example, road information, such as stairs, slopes, and steps, obstacle information, such as ambient people or objects, weather information, and the like are exemplified. The above-described accessory information can be acquired, for example, from the surrounding environment information recognized by the surrounding circumstance sensor 33. The above-described information is transferred by voice, whereby it is possible to provide voice guidance with higher convenience to the user.

In a case where information relating to the user type is included in the vehicle dispatch request, the control device 40 may identify the user type using the information.

In a case where the autonomous driving vehicle 30 includes a voice output device, such as a speaker, the control device 40 may transfer the guidance information from the voice output device of the autonomous driving vehicle 30. With this, it is possible to allow the user to use a direction of a transmission source of voice guidance as a material for determining the direction of the dispatched vehicle.

The voice guidance processing may be configured to be executed in the management server 20 that receives needed information from the autonomous driving vehicle 30.

Embodiment 2

Next, a vehicle dispatch system for an autonomous driving vehicle of Embodiment 2 will be described.

2-1. Features of Embodiment 2

The vehicle dispatch system 1 for an autonomous driving vehicle of Embodiment 2 has a feature in processing for, in a vehicle dispatch service with voice guidance, in a case where the user carries a cargo that should be stored in a trunk of an dispatched vehicle, providing the user with voice guidance to the front of the trunk. Hereinafter, specific processing that is executed in the vehicle dispatch system 1 for an autonomous driving vehicle of Embodiment 2 will be described in more detail referring to a flowchart.

FIG. 10 is a flowchart showing a routine where the control device 40 of the autonomous driving vehicle 30 executes voice guidance processing in the vehicle dispatch system for an autonomous driving vehicle of Embodiment 2. The routine is executed when the dispatched autonomous driving vehicle 30 picks the user up. In Steps S30 to S34 of the routine shown in FIG. 10, the control device 40 executes the same processing as in Steps S30 to S34 shown in FIG. 6.

In the routine shown in FIG. 10, next, the control device 40 determines whether or not the user carries a cargo of a size exceeding a threshold (Step S70). In Step S70, the control device 40 estimates the size of the cargo of the user using the surrounding environment information. Then, the control device 40 determines whether or not the estimated size of the cargo exceeds the threshold. The threshold in Step S70 is a threshold for determining whether or not the cargo needs to be loaded into the trunk. As a result, in a case where establishment of determination is not recognized, the process progresses to Step S80, and in a case where establishment of determination is recognized, the process progresses the next step.

In the next step, the control device 40 transmits information relating to a moving direction for allowing the user to move toward the trunk of the autonomous driving vehicle 30 to the user terminal 10 (Step S72). In Step S72, the control device 40 first determines a position and a direction of the user through the same processing as in Step S360 shown in FIG. 8. Next, the control device 40 generates guidance information including the moving direction for allowing the user to walk up to the trunk of the autonomous driving vehicle 30 through similar processing to Step S362 shown in FIG. 8. Next, the control device 40 transmits the generated guidance information to the user terminal 10 through the same processing as in Step S364.

Next, the control device 40 determines whether or not the user approaches within a range in which the user is able to load the cargo into the trunk of the autonomous driving vehicle 30 (Step S74). In Step S74, determination is made whether or not the position of the user estimated using the surrounding environment information is within the range in which the user is able to load the cargo into the autonomous driving vehicle 30. As a result, in a case where establishment of determination is not recognized, the processing of Step S72 is executed again, and in a case where establishment of determination is recognized, the process progresses to the next step.

In the next step, the control device 40 unlocks the trunk of the autonomous driving vehicle 30 and transmits guide information for prompting the user to load the cargo to the user terminal 10 (Step S76). As the guidance information described above, for example, guide of the trunk being unlocked, guide of the shape of the trunk or a way of opening the trunk, or the like is exemplified. The guide information may be transmitted from the autonomous driving vehicle 30 to the user terminal 10 through the management server 20 or may be transmitted directly from the autonomous driving vehicle 30 to the user terminal 10 through wireless communication.

Next, the control device 40 determines whether or not loading of the cargo is completed (Step S78). In Step S78, for example, determination is made according to whether or not the trunk is closed. As a result, in a case where establishment of determination is not recognized, the processing of Step S76 is executed again, and in a case where establishment of determination is recognized, the process progresses to the next step.

In the next step, the control device 40 transmits information relating to a moving direction for allowing the user to move from the trunk of the autonomous driving vehicle 30 toward the entrance door to the user terminal 10 (Step S80). In Step S80, the control device 40 first determines a position and a direction of the user through the same processing as in Step S360 shown in FIG. 8. Next, the control device 40 generates guidance information including the moving direction for allowing the user to walk up to the entrance door of the autonomous driving vehicle 30 through similar processing to Step S362 shown in FIG. 8. Next, the control device 40 transmits the generated guidance information to the user terminal 10 through the same processing as in Step S364. In next Steps S38 to S42, the control device 40 executes the same processing as in Steps S38 to S42 shown in FIG. 6.

With the voice guidance processing in the vehicle dispatch system for an autonomous driving vehicle of Embodiment 2 described above, in a case where the user who is a visually handicapped person carries the cargo, it is possible to transfer the moving direction to the trunk of the dispatched vehicle by voice. With this, it is possible to provide a vehicle dispatch service with high convenience to the user.

In the vehicle dispatch system for an autonomous driving vehicle of Embodiment 2, although the processing of Step S72 is described as the "guidance information generation processing" of the first aspect, this is an example of the embodiment.

2-2. Modification Example of Embodiment 2

The vehicle dispatch system for an autonomous driving vehicle of Embodiment 2 may be applied with a modified form as follows.

In a case where the cargo information is included in the vehicle dispatch request, the control device 40 may determine the trunk use need of the user using the cargo information.

What is claimed is:

1. A vehicle dispatch system for an autonomous driving vehicle that provides a vehicle dispatch service of the autonomous driving vehicle to a user, the vehicle dispatch system comprising a control device configured to provide information for guiding the user to the autonomous driving vehicle when the autonomous driving vehicle picks the user up, wherein:
the control device is configured to execute user type identification processing for identifying a user type indicating whether the user is a visually handicapped person or a healthy person, and when the user is identified to be the visually handicapped person, execute voice guidance processing for performing voice guidance for the visually handicapped person;
the autonomous driving vehicle comprises an image recognition unit configured to perform image recognition of the user and estimate a position of the user when the user is in an area surrounding the autonomous driving vehicle; and
the voice guidance processing comprises guidance information generation processing for generating guidance information including a moving direction for allowing the user to approach the autonomous driving vehicle based on an image recognition result of the image recognition unit, and guidance information transfer processing for transferring the guidance information to the user by voice,
wherein the guidance information generation processing is configured to estimate the moving direction based on a direction of a cane carried with the user which is recognized by the image recognition unit, and
wherein the guidance information transfer process transfers the guidance information, including the direction of movement of the user based on the position of the user and the estimated moving direction, to the user by voice.

2. The vehicle dispatch system according to claim 1, wherein the user type identification processing is configured to identify the user type according to whether an article associated with the visually handicapped person is included in belongings of the user recognized by the image recognition unit.

3. The vehicle dispatch system according to claim 1, wherein the guidance information generation processing is configured to estimate the moving direction based on a direction of the user recognized by the image recognition unit or the direction of the cane carried with the user.

4. The vehicle dispatch system according to claim 1, wherein the voice guidance processing further comprises approach information transfer processing for transferring approach information by voice when the autonomous driving vehicle approaches a pickup position.

5. The vehicle dispatch system according to claim 1, wherein the voice guidance processing further comprises getting-in information transfer processing for transferring information for prompting the user to get in the autonomous driving vehicle by voice when the user approaches a position where the user is able to get in the autonomous driving vehicle.

6. The vehicle dispatch system according to claim 1, wherein:
the image recognition unit is configured to perform image recognition of cargo information as information relating to a cargo carried with the user; and
the guidance information generation processing is configured to, based on the cargo exceeding a predetermined size is included in the cargo information, generate the guidance information including a moving direction for allowing the user to walk up to a trunk of the autonomous driving vehicle.

7. The vehicle dispatch system according to claim 1, wherein the voice guidance processing is configured to perform the voice guidance using a voice output device of a user terminal carried with the user.

8. The vehicle dispatch system according to claim 1, wherein the voice guidance processing is configured to perform the voice guidance using a voice output device of the autonomous driving vehicle.

9. An autonomous driving vehicle that provides a vehicle dispatch service in response to a vehicle dispatch request from a user terminal carried with a user, the autonomous driving vehicle comprising:
an image recognition unit configured to perform image recognition of the user and estimate a position of the user when the user is in an area surrounding the autonomous driving vehicle; and
a control device configured to provide information for guiding the user to the autonomous driving vehicle when the autonomous driving vehicle picks the user up, wherein:
the control device is configured to execute user type identification processing for identifying a user type indicating whether the user is a visually handicapped person or a healthy person, and in a case where the user is identified to be the visually handicapped person, execute voice guidance processing for performing voice guidance for the visually handicapped person; and
the voice guidance processing comprises guidance information generation processing for generating guidance information including a moving direction for allowing the user to approach the autonomous driving vehicle based on an image recognition result of the image recognition unit, and guidance information transmission processing for transmitting the guidance information to the user terminal,
wherein the guidance information generation processing is configured to estimate the moving direction based on a direction of a cane carried with the user which is recognized by the image recognition unit, and
wherein the guidance information transfer process transfers the guidance information, including the direction of movement of the user based on the position of the user and the estimated moving direction, to the user terminal by voice.

10. The autonomous driving vehicle according to claim 9, wherein the user type identification processing is configured to identify the user type according to whether an article associated with the visually handicapped person is included in belongings of the user recognized by the image recognition unit.

* * * * *